Dec. 20, 1960 R. W. KETCHLEDGE 2,965,855

ELECTRICAL CIRCUIT

Filed April 8, 1957

INVENTOR
R. W. KETCHLEDGE

BY

ATTORNEY 2,965,855

ELECTRICAL CIRCUIT

Raymond W. Ketchledge, Whippany, N.J., assignor to Bell Telephone Laboratories, Incorporated, New York, N.Y., a corporation of New York Filed Apr. 8, 1957, Ser. No. 651,403

2 Claims. (Cl. 330—164)

Figure 1:
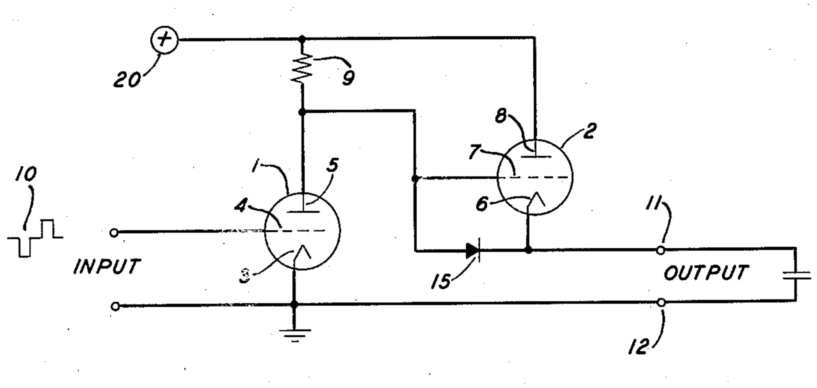

This invention relates to electrical circuits and more particularly to such circuits for driving a capacitive or other low impedance load.

There have been disclosed in the art various cathode follower type circuits for the driving of capacitive type loads or other loads presenting a low impedance to the driving signal. Such a circuit can be utilized because of its ability to furnish high output currents under the control of relatively low power input signals. But in cases where the driving signal consists of pulses having extremely short rise times, the stray capacities of leads and components in the output circuit, even if the connected load is non-capacitive, may have a significant effect in degrading the waveform of the signal being handled by the cathode follower, particularly for negative-going input pulses. Since the cathode follower alone is not particularly well adapted to driving capacitive loads in both positive and negative directions, it has been combined with various circuits to correct this inherent deficiency. However, until now it has always been necessary, in circuits to be used for input pulses of both polarities, to provide for the conduction of considerable current, even in the quiescent or no signal state, if fast signal response is to be achieved. This represents a substantial drain upon the power supply, particularly in cases where the control signal consists of pulses on an intermittent basis.

It is, therefore, a general object of this invention to provide an improved type of amplifier for driving capacitive or low impedance loads.

It is also an object of this invention to provide an improved amplifier for developing high output currents with minimum power source current drain.

It is another object of this invention to provide a cathode follower type of amplifier presenting a low output impedance for input pulses of both polarities.

In one specific embodiment of this invention these and other objects are attained by the use of two vacuum tubes in conjunction with each other and with a capacitive load so that the capacitor is charged through one tube and discharged through the other in response to input pulses of opposite polarity. During the period of no signal input, one tube is advantageously maintained in its cut-off condition by the use of a reverse breakdown diode of the type disclosed in W. Shockley Patent 2,714,702, issued August 2, 1955, while the other tube is held near cut-off so as to maintain the quiescent power supply current drain at a minimum. The breakdown diode, for voltages of a reverse polarity, has a region of high impedance for voltages below some particular potential and a region of constant potential at this point in which the impedance varies inversely with the current through the diode. Proper relationship between the breakdown diode and its associated tube in accordance with an aspect of my invention achieves matching of the reverse-polarity, constant-potential region of the diode to the cut-off bias of the tube advantageously to attain the above described objectives.

It is a feature of this invention that a breakdown device having different impedances for voltages greater and less than some threshold potential be provided to determine the control grid bias of an electron discharge device.

It is another feature of this invention that two electron discharge devices be provided in a push-pull arrangement in conjunction with a non-linear impedance breakdown device to furnish driving power to a capacitive load.

It is also a feature of this invention that a non-linear-impedance breakdown device be connected in an electron discharge device circuit so that for input pulses of one polarity the associated electron discharge device is maintained cut off by current through the breakdown device at a low value of impedance for the breakdown device.

It is a further feature of this invention that a non-linear-impedance breakdown device be connected in an electron discharge device circuit in conjunction with a load and a voltage source so that high current flows through the load in response to input signal pulses with a minimum of current being drawn from the voltage source in the absence of input signal pulses.

Another feature of this invention is the use of a breakdown device having different impedances for voltages above and below some threshold potential in an electrical circuit in which load current of one polarity is controlled through one amplifying device and load current of another polarity is controlled through a second amplifying device and the breakdown device.

Figure 2:
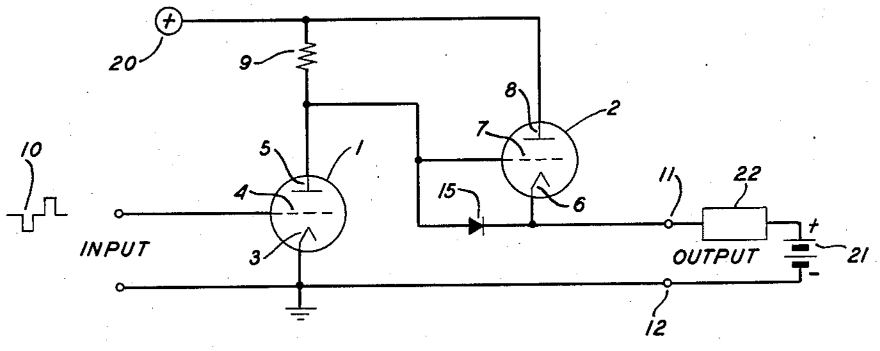

These and other features of this invention may be better understood by a description of certain specific embodiments depicted in the accompanying drawing in which:

Fig. 1 is a schematic representation of one specific embodiment of the invention depicted for driving a capacitive load; and Fig. 2 is a schematic representation of the specific embodiment of Fig. 1 depicted for driving a direct current load.

Referring to Fig. 1, vacuum tubes 1 and 2 are shown in direct connection with each other so that control grid 7 of tube 2 is tied to anode 5 of tube 1. This common point is connected to a source of positive potential 20 by resistor 9. Anode 8 of the tube 2 is directly connected to voltage source 20 so that when tube 2 is conducting a low impedance path is presented through the tube to furnish current at output terminal 11 which is connected to cathode 6 of tube 2. Fig. 1 shows a capacitive load connected between output terminals 11 and 12, terminal 12 being connected to a reference, or ground, point in the circuit. In tube 1 the cathode 3 is connected to this reference point. The input of the circuit is applied between control grid 4 and cathode 3 of tube 1. Tied between control grid 7 and cathode 6 of vacuum tube 2 is a reverse breakdown diode, the polarity of which is such that its forward direction is from grid to cathode.

For an understanding of the operation of this circuit let us assume that the load capacitor is initially charged to some potential midway between the potential of voltage source 20 and ground, as determined by the no-signal current through tube 1 and the value of resistor 9. Tube 2 and breakdown diode 15 are so selected that the threshold or breakdown potential of diode 15 coincides with the cut-off bias of tube 2 so that class B operation of the circuit will result. A negative pulse of input signal 10 applied to grid 4 drives tube 1 to cut-off. Under these conditions, anode 5 approaches the potential of voltage source 20. Since grid 7 of tube 2 is directly connected to anode 5, it is carried more positive and drives tube 2 into full conduction, thereby providing output lead 11 with a high current for rapid charging of the capacitive load. Upon the application of a positive pulse at control grid 4, tube 1 is driven into full conduction. Anode 5 thereby is brought toward ground potential, driving grid 7 negative with respect to cathode 6 and cutting off tube 2. As soon as the difference in potential between cathode 6 and grid 7 reaches the breakdown potential of diode 15, this diode breaks down and conducts current at a low impedance from output terminal 11 through itself and tube 1 to ground, thereby rapidly discharging the capacitive load. In the absence of signal the bias of tube 1 is maintained such that it conducts slightly, its current going on to flow through resistor 9. In such circumstances, diode 15 maintains control grid 7 negative with respect to cathode 6 at the cut-off bias of tube 2 so that no current flows through tube 2. Thus, it is seen that the circuit provides rapid charging or discharging of a capacitive load while requiring an extremely low current drain from the power source during periods of no signal input.

In the above described embodiment, electron di charge devices are employed as the active elements of the circuit. However, it is to be understood that other amplifying devices, such as transistors, could also be employed. The transistors could be directly substituted in the embodiment of Fig. 1 and, if n-p-n resistors are to be employed, the emitter of each transistor will correspond to the cathodes 3 and 6, the collectors to the anodes 5 and 8 and the bases to the control electrodes 4 and 7.

Furthermore, if transistors are to be substituted as described in the embodiment depicted in Fig. 1, the invention may be practiced by substituting for the reverse breakdown diode 15 of Fig. 1 a normal silicon diode connected with its forward direction opposite to the forward direction of the emitter-base junction with which it is in parallel. Thus if n-p-n transistors are substituted, the diode would be poled with its forward direction from emitter to base. Such a diode has a voltage current characteristic such that the impedance associated with reverse polarities of voltage across the diode is maintained as the voltage is carried positive until some threshold potential, normally about 0.5 volt, is reached, after which the impedance decreases drastically to the forward biased value. Transistors have the property that a small reverse bias, normally less than 0.5 volt, across the emitter-base junction cuts off the transistor. Thus, the normal silicon diode in conjunction with transistors as described above advantageously functions to accomplish the aims and objectives herein set forth within the teaching of this invention.

Fig. 2 is a diagram of the same embodiment as depicted in Fig. 1 connected to some direct-current load 22 in series with a battery 21. To realize the full advantage of this type of circuit, the load 22 may advantageously consist of a very low resistance, thereby requiring large driving currents in response to input signal pulses. It is not, of course, limited to such an impedance, but may be any suitable device requiring direct current for its operation. The potential of battery 21, for symmetrical operation of the circuit, is selected to be approximately midway between that of voltage source 20 and ground. Thus, for no signal input at control grid 4, the output terminal 11 is maintained at this battery potential so that no current flows through load 22. Under the application of signal pulses of either polarity, the operation of this embodiment is essentially identical to that described in the embodiment of Fig. 1 above. In either case, the circuit provides a high current through load 22 in either direction, depending on the polarity of the input pulse, while maintaining a low current drain upon source 20 in the absence of signal pulses 10.

It is to be understood that the above discussed circuits are merely illustrative of the application of the principles of the invention. Numerous other arrangements may be devised by those skilled in the art without departing from the spirit and scope of this invention.

What is claimed is:

1. An electrical circuit for applying bipolar pulses to a capacitive load comprising first and second space discharge devices each having a cathode, a control grid and an anode, a voltage source and a reference potential for supplying operating potentials to said space discharge devices, means connecting the control grid of said second space discharge device to the plate of said first space discharge device, means directly connecting a capacitive load between the cathode of said second space discharge device and said reference potential, means for applying signals of either polarity to the control grid of said first space discharge device, and biasing means for cutting off the current in said second space discharge device in the absence of a negative signal at the control grid of said first space discharge device comprising a breakdown element having a breakdown voltage in excess of the cut-off voltage of said second space discharge device and connected between the anode of said first space discharge device and the cathode of said second space discharge device so as to establish a forward direction of current from the anode of said first space discharge device to the cathode of said second space discharge device.

2. An electrical circuit in accordance with claim 1 wherein said breakdown element comprises a semiconductor reverse voltage breakdown diode having its anode connected to the anode of said first space discharge device.

References Cited in the file of this patent

UNITED STATES PATENTS

| | | |
|---|---|---|
| 2,714,702 | Shockley | Aug. 2, 1955 |
| 2,740,835 | Genaust | Apr. 3, 1956 |
| 2,744,169 | Deming | May 1, 1956 |
| 2,761,919 | Stillwell | Sept. 4, 1956 |
| 2,775,654 | Weighton et al. | Dec. 25, 1956 |
| 2,906,871 | Crawford | Sept. 29, 1959 |

FOREIGN PATENTS

| | | |
|---|---|---|
| 717,217 | Great Britain | Oct. 20, 1954 |